Feb. 8, 1944.  E. H. WHITE  2,341,065
FISH POLE HOLDER AND CLAMP
Filed Aug. 1, 1941
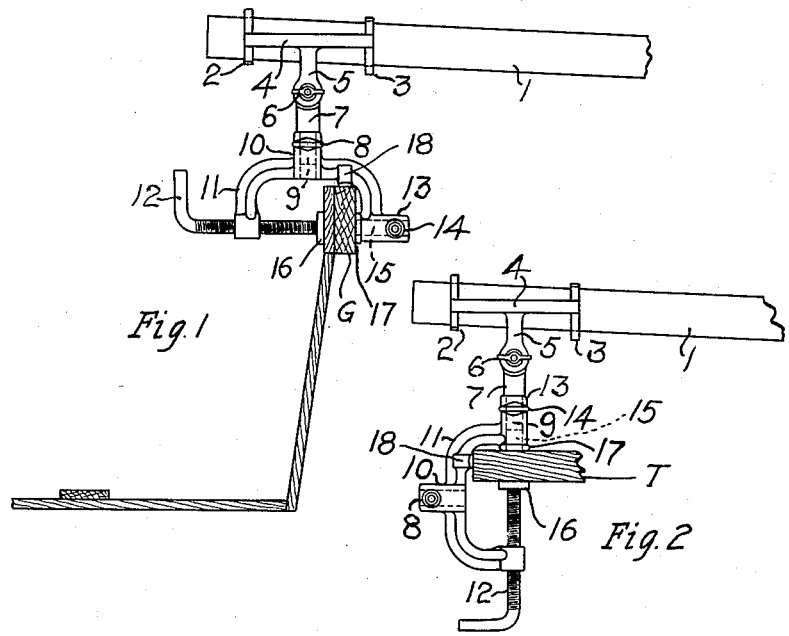
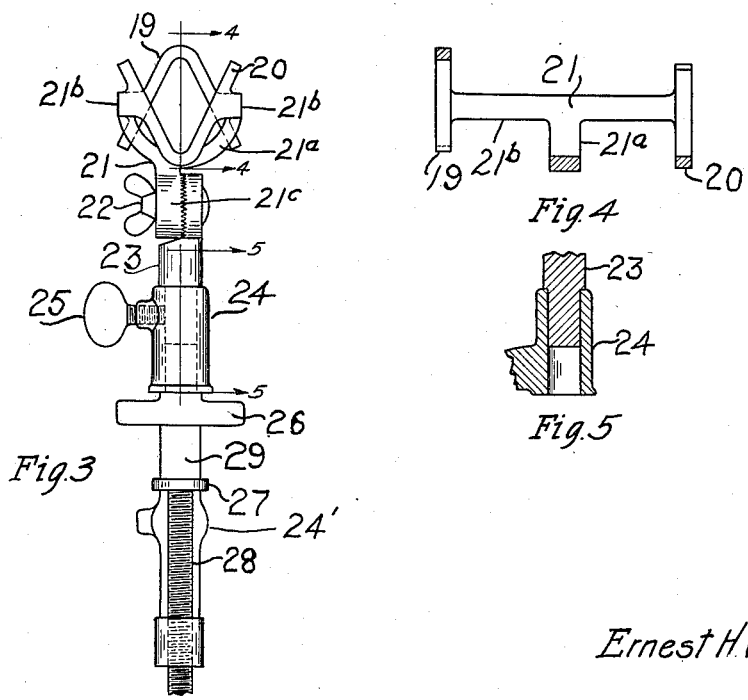
Inventor
Ernest H. White
By Samuel H. Davis
Attorney Patented Feb. 8, 1944

2,341,065

UNITED STATES PATENT OFFICE 2,341,065

FISH POLE HOLDER AND CLAMP

Ernest H. White, Eaton Rapids, Mich.

Application August 1, 1941, Serial No. 405,092

2 Claims. (Cl. 248—42)

My invention consists in a new and useful improvement in rod holders and is designed more particularly to provide a device to support a fishing rod in position for use, and adapted to be mounted on the gunwale or the thwart of a boat, or other suitable supporting media. The particularly novel and useful features of my improved device are the peculiar structural elements of the rod supporting means and the attaching means whereby the device is adjustably mounted on the supporting medium.

While I have illustrated in the drawing filed herewith and have hereinafter fully described two specific embodiments of my invention, it is to be distinctly understood that I do not consider my invention limited to said specific embodiments, but refer for its scope to the claims appended hereto.

In the drawing:

Fig. 1 is a side elevation of my improved device showing it applied to the gunwale of a boat in fragmentary section.

Fig. 2 is a side elevation illustrating the application of my device to a boat thwart shown in fragmentary section.

Fig. 3 is an end elevation of a modified form of my device.

Fig. 4 is a vertical section on the line 4—4 of Fig. 3.

Fig. 5 is a vertical section on the line 5—5 of Fig. 3.

As illustrated in the drawing (Figs. 1 and 2) the fishing rod 1 is positioned in rings 2 and 3 on bracket 4 having a shank 5 removably and adjustably mounted by thumb screw 6 on post 7, a thumb screw 8 engaging the shank 9 of post 7 in boss 10 forming a socket for the post 7 on the periphery of an arcuate frame 11 provided at one end with a clamping screw 12 and at the other end with a sleeve 13. As shown in Figs. 1 and 2, the screw 12 and sleeve 13 are disposed on a common axis at 90° to the axis of the socket of boss 10. A set screw 14 engages a removable plug 15 disposed in the end of the sleeve 13 adjacent the head 16 of the clamping screw 12, and provided with a pressure head 17 to co-act with the head 16 of the screw 12. The frame 11 is provided on its inner face with an integrally formed transverse rib 18 disposed between the boss 10 and the sleeve 13, at an angle of 90° to the common axis of the screw 12 and the sleeve 13, and having a rectilinear face parallel with said axis.

As illustrated in Figs. 3, 4 and 5, my improved device has the reversely related V-shaped rod-gripping members 19 and 20 mounted on bracket 21 which comprises a U-shaped cradle 21—a carrying at the tops of its arms bars 21—b on the ends of which are carried the members 19 and 20, respectively. The bracket 21 has a shank 21—c which is removably and adjustably mounted by thumb screw 22 on post 23 received in sleeve 24 and adjustably retained therein by set screw 25. In this form of my device, the sleeve 24, boss 24', the transverse rib 26, pressure head 27 on screw clamp 28 of frame 29 are identical with the corresponding elements of the form of my device shown in Figs. 1 and 2.

From the foregoing description of the details of construction of my improved device, its operation and use will be obvious. When it is desired to mount my device upon the gunwale G of a boat (Fig. 1), the frame 11 is disposed so as to embrace the gunwale G, its transverse rib 18 resting upon the top surface of the gunwale G, the clamping screw 12 is then operated to cause the head 16 to engage the inbored face of the gunwale G, thereby causing the head 17 of the plug 15 held in fixed position in sleeve 13 by set screw 14, to engage the outboard face of the gunwale G. Particular attention is directed to the fact that when the frame 11 is so applied to gunwale G, my improved device is caused to have a three-point engagement with the gunwale G, by means of the head 16, the head 17 and the rib 18, thereby producing an extremely stable relationship between my device and the gunwale G. When the frame 11 has been positioned, as above described, the post 7 is mounted upon the frame 11 by inserting its shank 9 into the socket of boss 10. The bracket 4 is then mounted on post 7 by attaching its shank 5 to the post 7 by screw 6. The rod 1 is then passed through rings 2 and 3 of the bracket 4. The rod 1 can then be moved in an arcuate path about the axis of post 7 to the desired position relative to the boat, and the screw 8 is then operated to fix the shank 9 of the post 7 in relation to boss 10. By slightly loosening screw 6, the rod can be moved in an arcuate path about the axis of screw 6 to the desired angle and the screw 6 is then operated to fix the shank 5 of bracket 4 in relation to the post 7.

When it is desired to mount my device upon the thwart T of a boat (Fig. 2) the frame 11 is disposed so as to embrace the thwart T, its transverse rib 18 being brought into intimate contact with the edge of the thwart T. The clamping screw 12 is then operated to cause the head 16 to engage the lower face of the thwart T, thereby causing the head 17 to engage the upper face of the thwart T. Particular attention is directed to the fact that when the frame 11 is so applied to the thwart T, my device is caused to have a three-point engagement with the thwart T, by means of the head 16, the head 17 and the rib 18, thereby producing an extremely stable relationship between by device and the thwart T. When the frame 11 has been positioned on the thwart T, as above described, the post 7 is mounted upon the frame 11 by inserting its shank 9 into the open upper end of the sleeve 13 where it may be fixed by screw 14, the further assembling and adjustment of the device being performed as above described.

The form of my device illustrated in Figs. 3, 4 and 5, while having the above described structural and functional improvements of the means for mounting my device, also embodies improvements in the means for supporting the rod. Particular attention is directed to the peculiar form and relation of the rod gripping members 19 and 20. Because the legs of each of these members are related at an angle somewhat less than 90° (Fig. 3), it functions not alone as a supporting rest for the rod, but as a gripping means whereby accidental longitudinal movement of the rod relative to the device is prevented. It is obvious that this gripping action is produced by the peculiar shape of each member, and the fact that the members 19 and 20 are reversely disposed with relation to the cradle 21—a, each being caused to function with reference to the other, so that they co-act to effectively grip the rod.

Having described my invention, what I claim is:

1. In a rod holder, the combination of an upright V-shaped rod gripping member and an inverted V-shaped rod gripping member in spaced substantially parallel relation to each other, each of said members being adapted to frictionally engage a rod placed therein at a plurality of points spaced about the circumference of the rod, means connecting said V-shaped members together, and additional means connected to the first named means to mount the latter on a support.

2. In a rod holder, the combination of a U-shaped cradle; a pair of parallel bars mounted on the tops of the arms of said cradle respectively; a pair of V-shaped rod-gripping members mounted at each end of said bars respectively, one of said V-shaped members being upright and the other member being inverted and adapted to frictionally engage a rod at circumferentially spaced points on the latter; and means connected to said U-shaped cradle adapted to adjustably mount the latter on a support.

ERNEST H. WHITE.